United States Patent
Bottrill

(10) Patent No.: US 6,707,690 B1
(45) Date of Patent: Mar. 16, 2004

(54) POWER CONVERTER EMPLOYING SWITCHED SPLIT TRANSFORMER PRIMARY

(75) Inventor: John Bottrill, Amherst, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/244,587

(22) Filed: Sep. 16, 2002

(51) Int. Cl.$^7$ ............................................. H02M 3/335
(52) U.S. Cl. .................................. 363/21.16; 363/56.11
(58) Field of Search .......................... 363/21.02, 21.04, 363/21.07, 210.08, 21.18, 21.12, 21.16, 21.17, 80, 79, 131, 56.11

(56) References Cited

U.S. PATENT DOCUMENTS

| | | | | |
|---|---|---|---|---|
| 3,889,173 A | * | 6/1975 | Klusmann et al. | ............. 363/19 |
| 4,016,482 A | * | 4/1977 | Cielo et al. | ................. 323/289 |
| 5,008,796 A | * | 4/1991 | Johnson | .................... 363/21.16 |
| 5,621,623 A | * | 4/1997 | Kuriyama et al. | ............ 363/20 |
| 5,959,438 A | * | 9/1999 | Jovanovic et al. | .......... 323/222 |

OTHER PUBLICATIONS

Product data sheet, UCC2850x BiCMOS PFC/PWM Combination Controller, Texas Instruments (Aug. 1999).

* cited by examiner

Primary Examiner—Rajnikant B. Patel
(74) Attorney, Agent, or Firm—W. Daniel Swayze, Jr.; W. James Brady; Frederick J. Telecky, Jr.

(57) ABSTRACT

A pulse-width modulated apparatus to convert an input voltage to an output voltage at advantaged duty-cycles utilizes more than two switches in a converter design. The switches implement current paths that allow a single primary winding to be formed of primary winding segments. Intermediate points in the transformer primary winding are connected to switches and diodes such that during the OFF phase of the duty-cycle, the transformer segments discharge more quickly, thereby allowing the ON Phase of the duty-cycle to be longer than the OFF phase. During the OFF phase, the switches isolate the segments from each other while the diodes provide a magnetizing current discharge path. An output stage connected across the secondary winding regulates the output voltage by implementing a forward converter.

10 Claims, 6 Drawing Sheets

POWER CONVERTER EMPLOYING SWITCHED SPLIT TRANSFORMER PRIMARY

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Power converters are electrical devices that are used to convert one voltage to another voltage. In most instances, they take a variable voltage and convert that voltage to a fixed voltage. In the case of the topologies discussed herein, the converters do this buy varying the duty cycle of the power switches. If the input voltage decreases, the pulse width, which is controlled by the control circuitry (not shown) increases the ON time of the transistor switches so that the output remains at the desired voltage.

One of the topologies used in converting power from one voltage to another is the two-switch forward converter. In this topology, a primary side voltage is applied across a winding of a transformer and, through that, a voltage is induced in the secondary of the transformer. The voltage across the primary is applied and removed by cycling switches. The alternating application and removal of the primary voltage causes an AC voltage to appear on the secondary of the transformer. This voltage is rectified, filtered, and applied to a load across the output.

When the switches are on, the voltage across the primary of the transformer leads to a build up of magnetizing current within the transformer. This build up of the magnetizing current, if left unchecked, would saturate the transformer, resulting in a decrease of the primary inductance of the transformer and the eventual failure of the circuit due to excessive current. To prevent this failure, the switches are cycled with a duty-cycle that is limited to 50% or less. During the OFF portion of the cycle, the inductive current built up during the ON part of the cycle is dissipated, by returning the energy to the input source. This cycling creates an equal and opposite voltage-time integral across the primary, while limiting the voltage seen by the switches to the input voltage. When the voltage-time integral for each cycle is zero, there is no net increase of the magnetizing current and hence no saturation of the transformer and no reduction of the inductance of the transformer primary, therefore stable operation is possible.

For the forward converter, the 50% duty-cycle limit imposes undesirable limitations on the output inductor, voltage range, transformers, and downstream converters. The output inductor must be larger than in circuits having higher duty-cycles to achieve the same minimum load continuous current in the inductor. The transformer must be able to handle higher RMS current and peak currents for the lower duty-cycle. Therefore, there is impetus to increase the duty-cycle.

One way to increase the duty-cycle has been to use a single-switch converter. In some versions, this variant allows duty-cycles of greater than 75%. However, the single-switch converter requires a way to absorb the magnetizing current thereby resetting the transformer. A snubber/clamp circuit has been used for this, but generates both heat and electrical noise in the form of EMI. A separate reset winding in the transformer has been used also, but increases the cost due to the special transformer and, because of leakage inductance, may not work as well as desired. Because the single-switch converter with a duty cycle greater than 50% places voltages that are more than twice the input voltage across the semiconductors for the off time of the duty-cycles, the semiconductors must be rated for a higher voltage than those used in the two-switch converter. A circuit configuration that increases the duty-cycle above 50% while permitting the use of conventional lower voltage components is needed.

BRIEF SUMMARY OF THE INVENTION

A forward converter implemented with three or more switches allows a transformer to reset more quickly permitting duty-cycles greater than 50% for converters implemented with non-high voltage components. The multi-switch converter uses a transformer in which the primary is implemented in segments with the ends of the segments accessible. The switches bridge the segments and the connections between the primary and input power allowing current flow through the primary when all switches are ON. When all switches are OFF, each segment is separate. Diodes connecting the segments ends and the power rails permit resetting current flow when the switches are OFF. When the switches are ON, the voltage across the entire primary is approximately the input voltage. When the switches are OFF and the diodes are allowing the magnetizing current to flow, each segment of the primary has approximately the input voltage across it. The equivalent of multiple times the input voltage is present across the primary while no more than the input voltage appears across any component. The increased effective primary reset voltage allows a faster reset time during a shortened OFF cycle.

The normal topology of power transformers, implementing the primary winding as two segments with the secondary sandwiched between them, makes the three-switch converter an economical way to implement duty-cycles up to 67%. When higher duty-cycles are required, additional segments, switches and diodes are incorporated in the converter. Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

The present invention relates generally to pulse-width modulated transformer-coupled power supplies, termed converters, and, more specifically, to converters capable of operating at a duty-cycle of greater than 50%.

Figure 1:
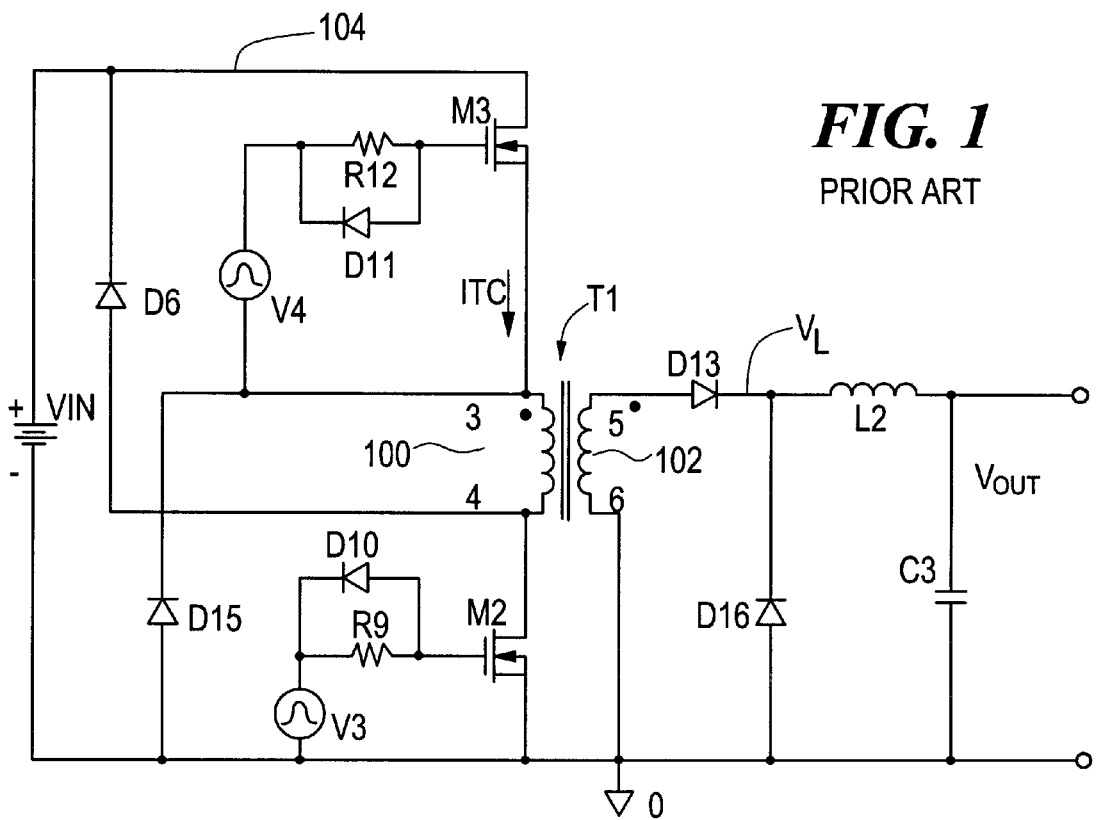
FIG. 1 is a circuit diagram of a prior art two-switch forward converter.

A two-switch forward converter, as is known in the industry, is illustrated in FIG. 1. The input voltage VIN is applied across a primary winding 100 of transformer T1 when two switches, implemented by transistors M2 and M3, are closed. This applied voltage induces a voltage $V_L$ across the secondary 102 of transformer T1. Transistors M2 and M3 are controlled in tandem by pulse generators V3 and V4 that are generated by any number of known methods. The alternating application and removal of primary voltage VIN causes an AC voltage $V_L$ to appear on secondary 102 of transformer T1. Voltage $V_L$ is rectified by diode D13 and low-pass filtered through filter L2 and C3 resulting in output voltage VOUT. A load (not shown) is applied across the output VOUT. VOUT is fed to a control circuit (not shown) that controls the duty-cycle of switches M2 and M3.

Switches M2 and M3 are controlled such that they are both ON or both OFF. When both M2 and M3 are ON, the voltage on primary 100 of transformer T1 is equal to input voltage VIN, and this voltage induces voltage $V_L$ on the secondary 102. Simultaneously, input voltage VIN applied across primary 100 leads to a build up of magnetizing current within the transformer. The increasing magnetizing current, if not reset, would saturate transformer T1, resulting in a decrease of the primary inductance of the transformer T1 and eventually failure of the circuit due to excessive current.

Figure 2A:
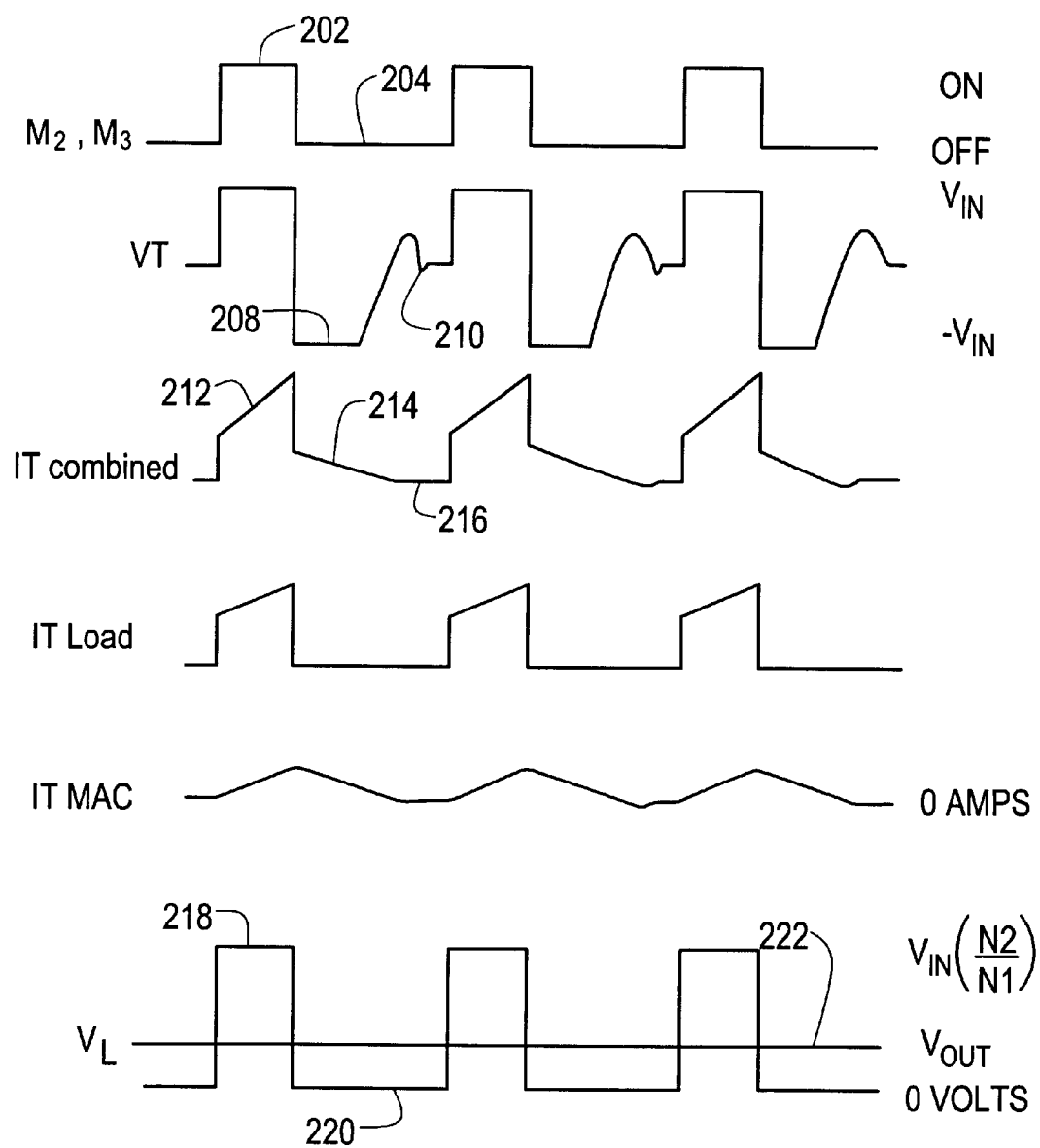
FIG. 2A shows waveforms in the circuit of FIG. 1 when operating with a 33% duty-cycle.
Figure 2B:
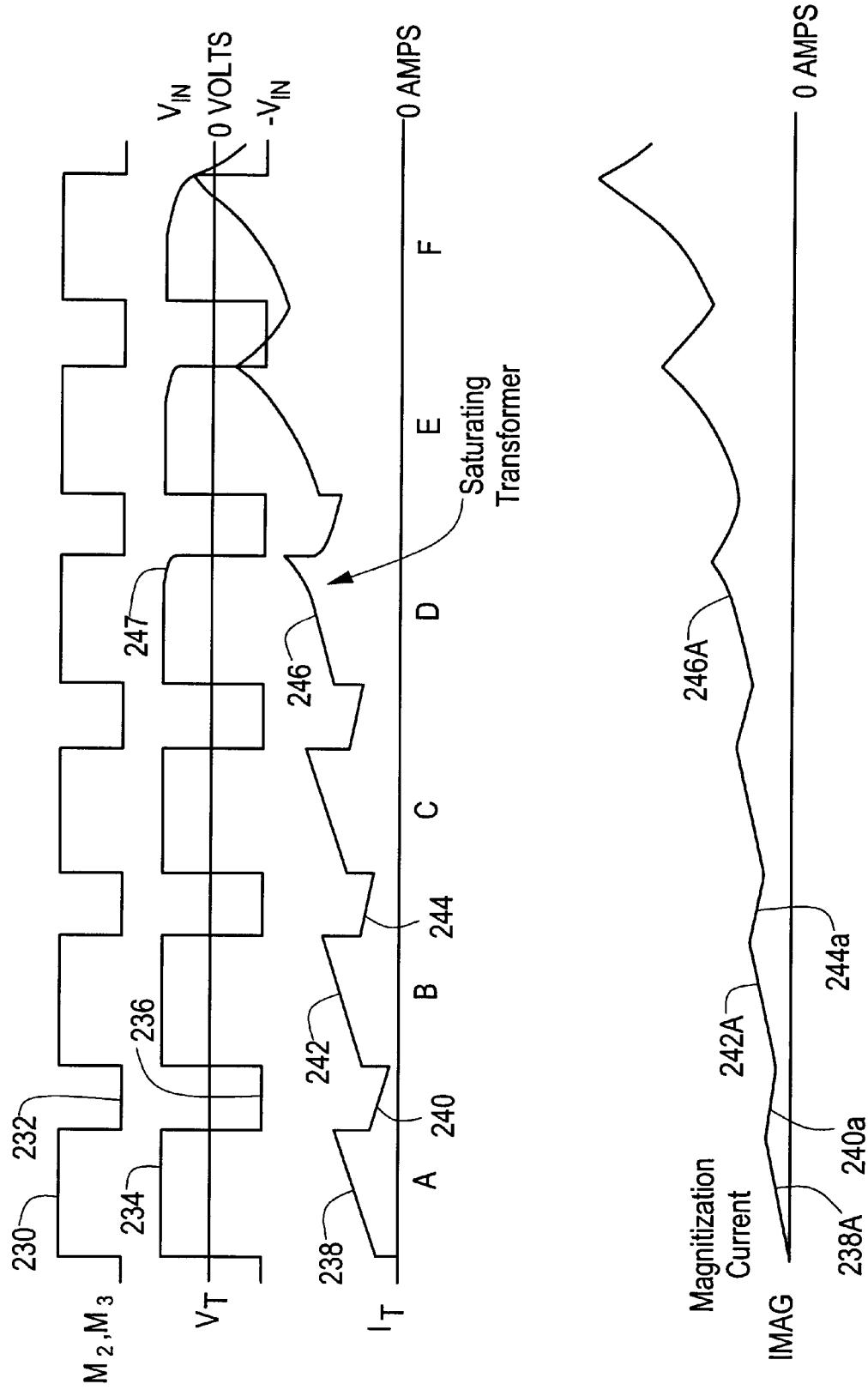
FIG. 2B shows waveforms in the circuit of FIG. 1 when operating with a 67% duty-cycle.

To build functional converters, the voltage-time integral on the transformer primary over each cycle (transistors ON then OFF) must equal zero. The ON time of transistors M2, M3 is usually limited to less than 50% of the cycle (a 50% duty-cycle). During the OFF portion of the cycle, the inductive current built up during the ON part of the cycle is returned to the input source by diodes D6 and D15. The reversed current causes an equal and opposite voltage across primary 100 until the voltage-time integral is zero for the cycle. When the duty-cycle is less than 50%, the current will flow until the integral of voltage over time equals zero and then will cease flowing. Because no magnetizing current remains, the inductance of primary 100 stays constant. The timing diagram of FIGS. 2A and 2B illustrates operation of the prior art in FIG. 1. FIG. 2A shows the operation of the converter operated at a duty-cycle less than 50%, in this case a 33% duty-cycle. Transistors M2 and M3 are ON for an ON-interval 202 lasting for one-third of the cycle and they are OFF for an OFF-interval 204 lasting two-thirds of the cycle. The voltage VT across the primary of transformer T1, is equal to input voltage VIN during the ON-interval 202. For approximately an equal time period 208, VT is equal to the negative of VIN. VT then returns to approximately zero, except for some ringing of the signal, for the remainder of the cycle 210. Hence, the voltage-time integral for VT over one cycle is zero. The primary combined current ITC, consisting of the magnetization current and the load current in the transformer primary, rises during the ON-interval 212 and decreases for an equal time 214. Once ITC has returned to zero, it remains there. The current $IT_{LOAD}$ shows the load portion of the combined current and $IT_{MAG}$ shows the magnetizing current of the ITC combined waveform. The voltage $V_L$ on the secondary after the diode is equal to VIN (for a 1:1 transformer) during the ON-interval 218 and is equal to zero the remainder of the cycle 220, producing an average VOUT 222 equal to $V_L$*duty-cycle.

FIG. 2B shows the destructive buildup of primary current that occurs when the converter is operated at greater than a 50% duty-cycle, in this case at a 67% duty-cycle. Transistors M2 and M3 are ON during an ON-interval 230 lasting two-thirds of the cycle, and are OFF for an OFF-interval 232 lasting for one-third of the cycle. The voltage VT across the transformer is equal to input voltage VIN during the ON-interval 234. VT is equal to the negative of VIN for the entire OFF-interval 236, but this is not sufficient to drive the voltage-time integral to zero. Consequently, the total current ITC and especially the magnetizing current component $I_{MAG}$ rises during each ON-interval 238, 238A, 242, 242A and does not return to its starting point during the OFF-intervals 240, 240a, 244, 244a. Within a short period, the magnetizing current ratchets up out of control as the transformer saturates 246, 246a resulting in the voltage across the winding starting to collapse 247 because of the high currents and a voltage build up across the switches. This situation prevents this circuit from operating at greater than 50% duty-cycle.

The 50% duty-cycle limitation affects many of the parameters of the circuit. The output inductor L2 must be larger than in a circuit that can operate at a higher duty-cycle to achieve the same minimum load continuous current through the inductor. The input voltage range is limited because of the need to maintain a volt second balance across the transformer. If an increased duty-cycle could have been used, the RMS and peak currents in the transformer could be reduced allowing for lower losses and potentially smaller design.

Figure 1A:
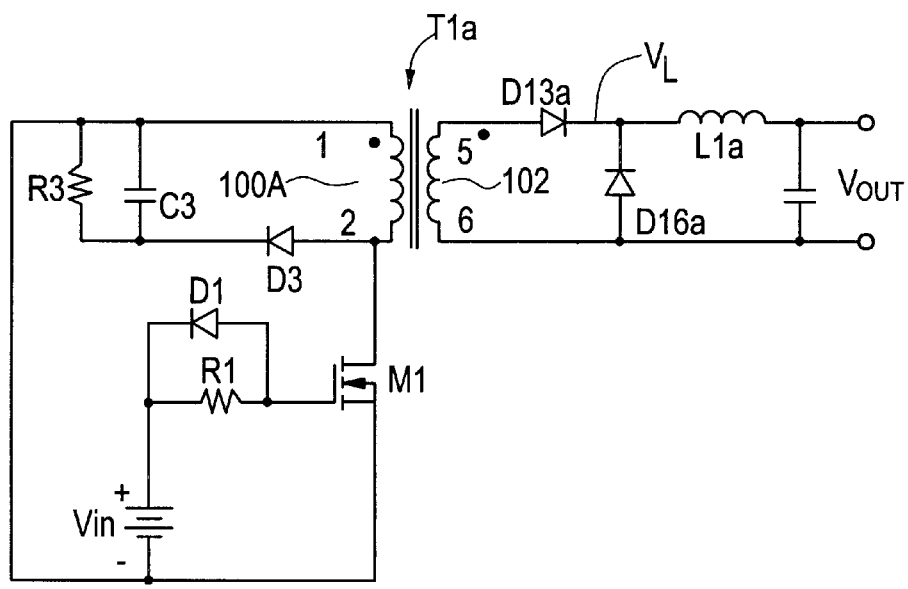
FIG. 1A is a circuit diagram of a prior art single-ended forward converter.

A single-switch forward converter, as shown in FIG. 1A, can operate with a duty-cycle greater than 50% when a reset path is provided. The reset path may involve a resistor R3/capacitor C3/diode D3 clamping circuit (RCD) to absorb the magnetizing current and allow the reverse voltage generated by the magnetizing current to reset transformer T1 by bringing the volt-second integral to zero. However, energy is lost in the RCD circuit due to heat and conducted and radiated noise. The EMI goes up and the efficiency goes down with this circuit. In addition, because the voltage across the transformer primary 100A during the OFF-interval increases in inverse proportion to the duty-cycle, the switching transistor M1 must be a high voltage device to handle this voltage, including any ringing and spikes. In addition, transformer T1 must be able to handle these higher voltages. Therefore, the cost of the entire single-switch forward converter circuit increases due to these factors.

Figure 3:
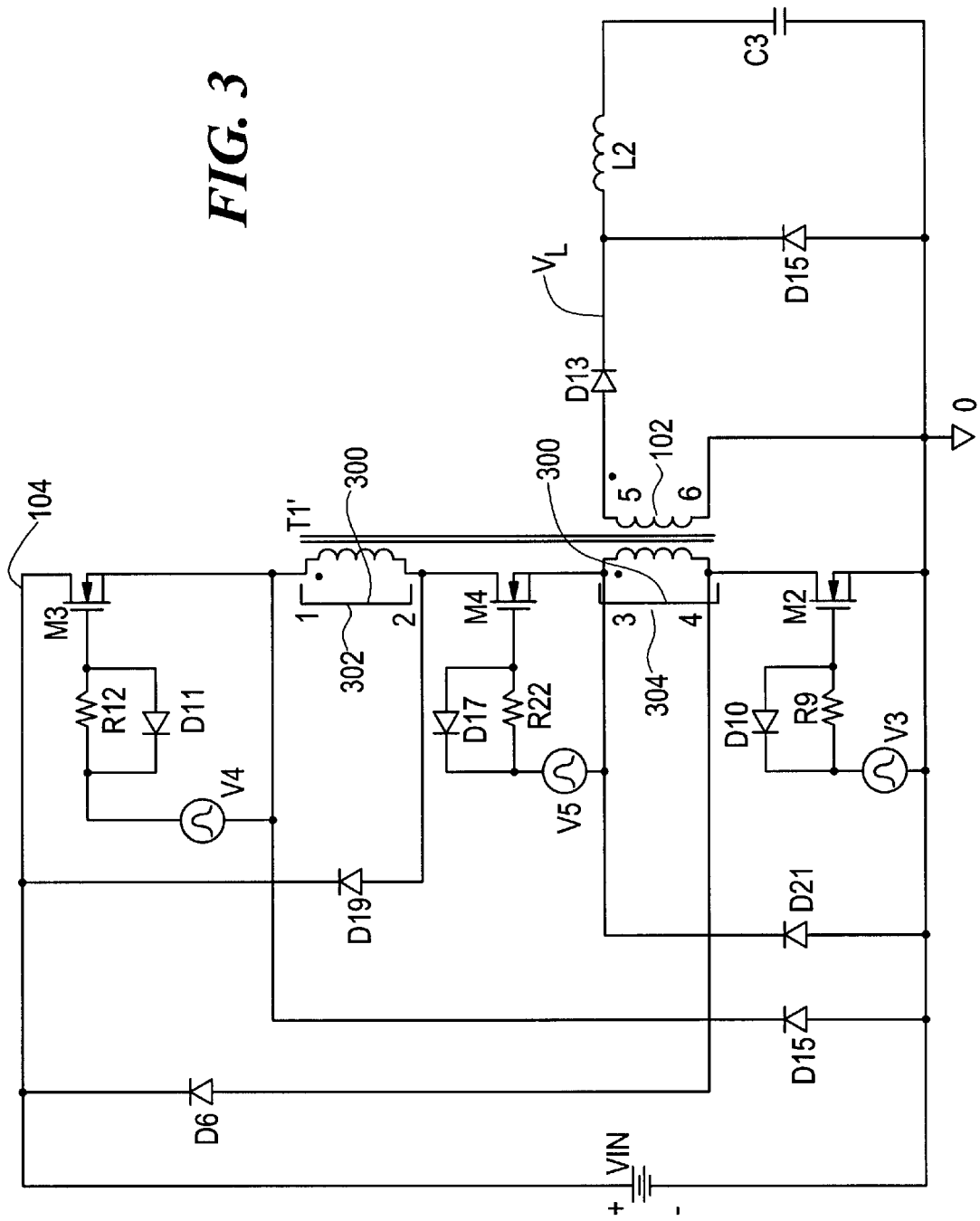
FIG. 3 is a circuit diagram of an embodiment of a three switch forward converter according to the invention.

A forward converter using three or more switches according to the invention allows use of lower cost, lower resistance parts while allowing the duty-cycle to increase beyond 50%. FIG. 3 illustrates an embodiment of a three-switch forward converter implemented with FETs as the switches, although both bi-polar transistors and IGBTs can be used also. The input voltage VIN is applied across a primary winding 300 of transformer T1' when three switches, implemented by transistors M2, M3 and M4 are closed. In many cases, primary winding 300 is usually split to get better coupling with the secondary. Half 302 of primary winding 300 is placed next to the center of transformer T1' and half 304 of primary winding 300 is placed on the outer layer of transformer T1'. Secondary 102 is physically sandwiched between the two halves of the primary winding 300 thereby improving coupling. The three-switch converter accesses the terminals of each of the halves 302, 304 to allow the switches M2, M3, and M4 to be connected in series with the segments of the primary. The applied voltage induces a voltage $V_L$ across the secondary 102 of transformer T1'. Transistors M2, M3 and M4 are controlled in tandem by pulse generators V3, V4 and V5 that are controlled by any number of known control methods as previously discussed. The alternating application and removal of primary voltage VIN causes an AC voltage $V_L$ to appear on secondary 102 of transformer T1'. Voltage $V_L$ is rectified by diode D13 and low-pass filtered through filter L2 and C3 resulting in output voltage VOUT. A load (not shown) is applied across the output VOUT. In many cases, VOUT is fed to a control circuit (not shown) that controls the duty-cycle of switches M2, M3 and M4.

Switches M2, M3 and M4 are controlled such that they are all ON or all OFF. When all switches are ON, the voltage on primary 300 of transformer T1' is equal to input voltage VIN, and this voltage induces voltage $V_L$ on the secondary 102. Simultaneously, input voltage VIN applied across primary 300 causes a build up of magnetizing current within transformer T1. The increasing magnetizing current, if unchanged, would saturate transformer T1, resulting in a decrease of the primary inductance of the transformer T1 and eventually failure of the circuit due to excessive current. The OFF-interval of the duty-cycle must prevent this failure.

To build functional converters, the voltage-time integral over each cycle (transistors ON then OFF) must equal zero. During the OFF portion of the cycle, the segments 302 and 304 of the primary 300 are separated with no current flowing through the switches M2, M3 and M4. The diodes D21 & D6, D15 & D19 connecting the segment terminals to the power rails allow the inductive current to continue to flow during the OFF-interval, causing a reversed voltage across each segment. Since the inductive current portion of the primary current flowing in the segments has the same magnitude and polarity as when the primary segments were connected, the voltage across each separate segment equals the voltage that had been across the primary, VIN.

When switches M2, M3 and M4 are all turned ON, no current flows in diodes D6, D15, D19 and D21. When the switches are turned OFF, the magnetizing current still flows, resulting in the reversal of the voltage across the windings. This reverse voltage increases until the diodes conduct and the magnetizing current returns to the power source from the separate segments 302, 304 of the primary winding 300. In the case of winding 302, the current flows from ground, through D15 into winding 302, and out through D19 to the positive side of VIN. In the case of winding 304, the current flows from ground, through D21 into winding 304, out through D6 to the positive side of VIN. Since the magnitude of the magnetizing current remains the same during the transition from ON to OFF-interval, the voltage across each winding 302, 304 equals VIN during the OFF-interval and the effective voltage across T1' is 2VIN during the OFF-interval. Each winding however experiences only the input voltage VIN across it, because switch M4 isolates the windings 302, 304. With an effective doubling of the reverse voltage, the negative portion of the voltage-time integral is satisfied in half the time of the positive portion.

Figure 4A:
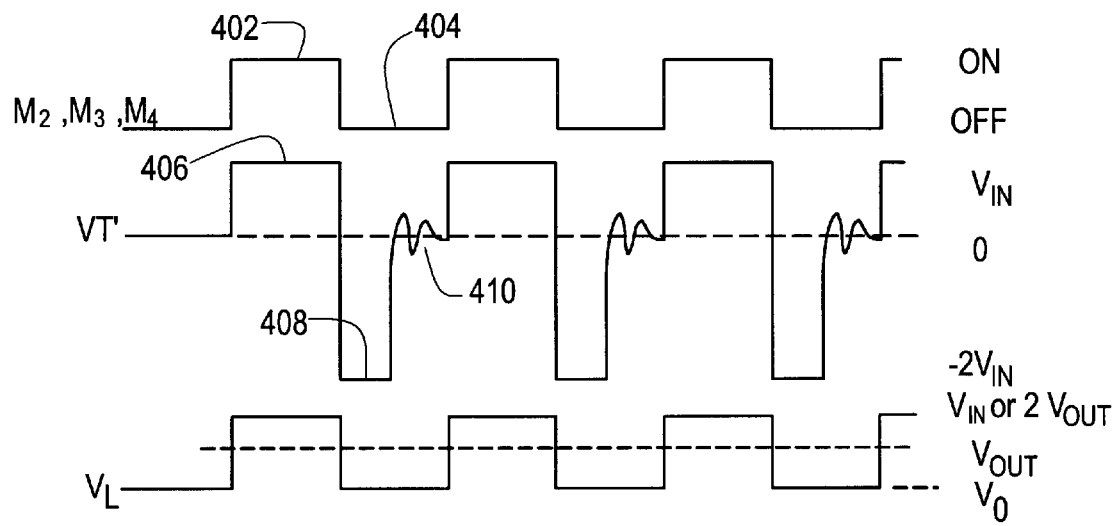
FIG. 4A shows waveforms in the circuit of FIG. 3 when operating with a 50% duty-cycle.
Figure 4B:
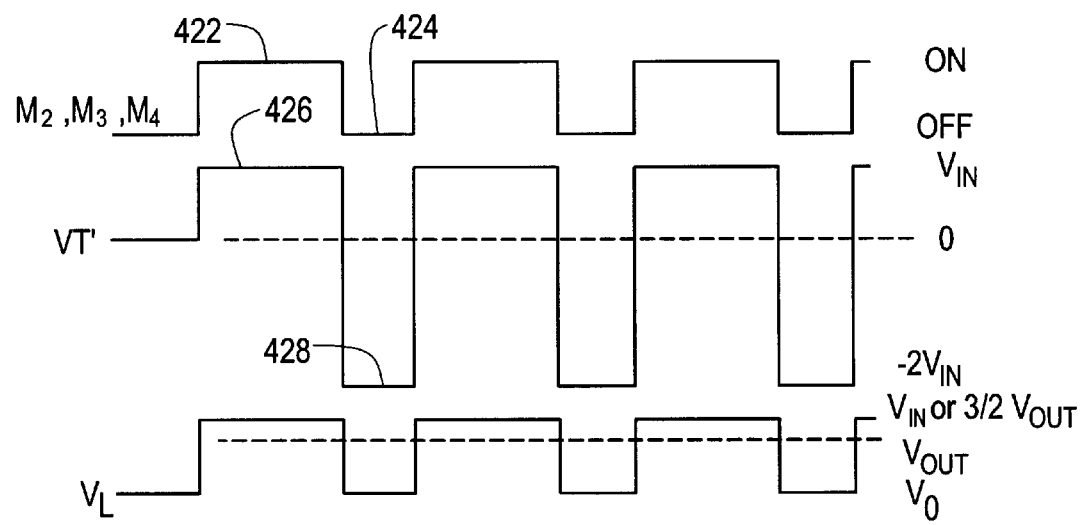
FIG. 4B shows waveforms in the circuit of FIG. 3 when operating with a 67% duty-cycle.

The timing diagrams of FIGS. 4A and 4B illustrate the operation of this embodiment. FIG. 4A shows the operation of the converter operated at a duty-cycle of 50%. Switches M2, M3 and M4 are ON for an ON-interval 402 that is equal to the time when they are OFF, OFF-interval 404. The voltage VT' across the transformer T1' is equal to input voltage VIN during the ON-interval 406. During the OFF-interval 404, made up of time 408 and 410 each winding 302, 304 has a voltage equal to −VIN across it for the time 408, making the effective voltage across transformer T1' equal to −2VIN 408. During the time 410, the magnetizing energy has mainly dissipated and the parasitic elements cause the windings to ring. The integral of VT' over the ON and OFF-intervals (402 and 404) totals zero halfway through the OFF time, so VT' settles to zero volts after some oscillation 410.

The voltage across the secondary of the transformer $V_L$ when the switches are ON is VIN (for a 1:1 transformer) and, when the switches are OFF, is zero. For a 50% duty-cycle, this averages to ½VIN. $V_L$ is smoothed out by the filter formed by $L_2$ and $C_3$, so that VOUT also equals ½ VIN.

In FIG. 4B, a 67% duty-cycle is represented. Switches M2, M3 and M4 are ON for an ON-interval 422 that is two-thirds of the cycle and are OFF for an OFF-interval 424 that is one-third of the cycle. The voltage VT' across the transformer T1' during the ON-interval 422 equals VIN 426. During the OFF-interval 424, each winding 302, 304 has a voltage equal to −VIN across it, making the effective voltage across transformer T1' equal to −2VIN 428. The voltage across the transformer secondary $V_L$ when the switches are ON is VIN, which is 1.5 VOUT. When the switches are OFF, $V_L$ is zero. Over the cycle therefore, $V_L$ averages to VOUT because the duty-cycle is 67%. The output voltage VOUT during both parts of the duty-cycle stays constant after filtering. If VIN decreases, the control system (not shown) would increase the duty cycle to try to maintain VOUT constant. The integral of VT' over the ON and OFF-intervals (422 and 424) totals zero exactly as the cycle ends. If a higher duty-cycle were attempted, the current would build up, as described above, destroying the system.

The three-switch forward converter allows the use of lower voltage transistors than the one-switch design, because the voltage experienced by any transistor is limited to the input voltage. In addition, since the magnetizing energy is returned to the source, efficiency is improved over the energy dissipating one-switch design. Further, the generated electro-magnetic-interference (EMI) is comparable to that of the two-switch converter.

Figure 5:
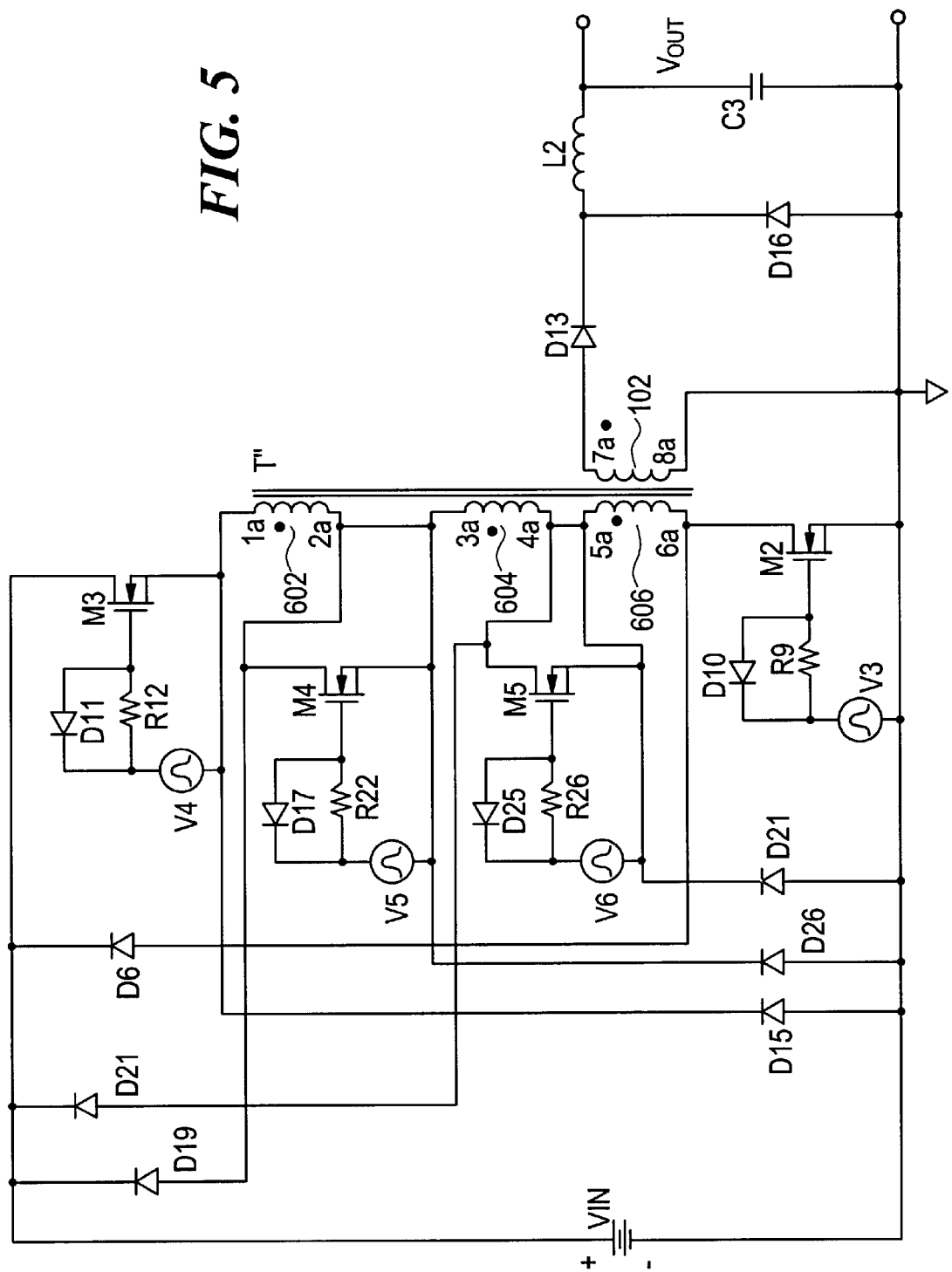
FIG. 5 is a circuit diagram -of an embodiment of a four switch forward converter according to the invention.

The principles behind the duty-cycle improvement from a two-switch converter to a three-switch converter can be extended if a higher duty-cycle is needed, but custom primary windings will be needed. A four-switch forward converter operates at up to a 75% duty-cycle, and requires a primary winding that has been explicitly formed as three segments as shown in FIG. 5. In FIG. 5 the primary of transformer T'' includes three segments 602, 604 and 606 with corresponding terminals. Switches M4 and M5 are each interposed between adjacent segments of the primary winding as shown. Diodes (D15, D26, D21) are connected between the negative rail and the high end terminal of each segment (1a, 3a, and 5a), and diodes (D19, D27, D6) are connected between the low end terminal of each segment (2a, 4a, 6a) and the positive rail. The four-switch forward converter has an effective VT''' during the OFF time equal to three times VIN, yielding a maximum duty-cycle of 75%. It will be appreciated that a maximum duty-cycle of 80% can be obtained for a five-switch converter, 83% for a six-switch converter, etc.

Having described preferred embodiments of the invention it will be apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A pulse width modulated apparatus to convert an input voltage to an output voltage at duty-cycles exceeding 50% comprising:

a transformer having a primary winding coupled to a secondary winding, the primary winding including a plurality of segments, each segment from the others and having a high end terminal and a low end terminal, each terminal accessible within the apparatus;

a first switch connected between a positive rail and a high end terminal of a first primary segment;

a second switch connected between a negative rail and a low end terminal of a last primary segment;

a number of intermediate switches connected between a low end terminal of a segment and a high end terminal of an adjacent segment, wherein each intermediate switch is interposed between a pair of segments to allow the full primary winding to function when all switches are closed;

a plurality of pairs of diodes, each pair of diodes associated with a segment of the plurality of segments, a first diode of each pair of diodes connecting a high end terminal of the associated segment to the negative rail, a second diode connecting a low end terminal of the associated segment to the positive rail, wherein the diodes conduct for a part of the duty-cycle when the switches are open; and an output stage connected across the secondary of the transformer.

2. The apparatus of claim 1 where the output stage includes a pair of diodes, an inductor and a capacitor connected as a forward converter.

3. The apparatus of claim 1 wherein each switch of said first, second and number of intermediate switches are semiconductor switches including a FET as a switching device.

4. The apparatus of claim 1 wherein each switch of said first, second and number of intermediate switches are semiconductor switches including a bi-polar transistor as a switching device.

5. The apparatus of claim 1 wherein each switch of said first, second and number of intermediate switches are semiconductor switches including an IGBT as a switching device.

6. The apparatus of claim 1 wherein the first, second and number of intermediate switches are operated in tandem, switching approximately simultaneously.

7. The apparatus of claim 1 wherein the number of intermediate switches is one and the duty-cycle has a high limit of 67 percent.

8. The apparatus of claim 1 wherein the number of intermediate switches is two and the duty-cycle has a high limit of 75 percent.

9. A pulse-width-modulated transformer-coupled power supply operative to convert an input voltage to an output voltage utilizing duty-cycles greater than 50% comprising:

a voltage source defining a high rail and a low rail available at a set of terminals;

a transformer having a primary winding including a plurality of segments, a pair of high and low terminals accessible for each segment and a secondary winding coupled to the primary winding;

a plurality of switches, controlled such that all switches are simultaneously on and off at alternate times, the switches interposed among the segments, the positive rail and negative rail, wherein when all switches are on, a current flows from the positive rail, through each of the plurality of segments and switches to the negative rail and when all switches are off, the switches provide no path among the segments, the positive rail and the negative rail;

a plurality of pairs of diodes, each pair of diodes connected to a segment of the plurality of segments wherein, when the switches are off, each pair of diodes provides a current path from the negative rail, through the respective segment, to the positive rail; and an output stage bridging the secondary winding providing an output voltage across a pair of output terminals, wherein when the switches are on, a magnetizing current flows and a voltage is present across the primary winding and when the switches are off, the magnetizing current flows and an opposite voltage is present across the primary winding until a voltage-time integral of the primary equals zero.

10. The pulse-width-modulated transformer-coupled power supply of claim 9 wherein there are n segments in the primary winding and the duty-cycle is (n−1)/n.

* * * * *